(12) United States Patent
Kim

(10) Patent No.: US 10,183,709 B2
(45) Date of Patent: Jan. 22, 2019

(54) CRAWLER WITH WEAR LIMIT INDICATOR

(71) Applicant: TR Beltrack Co., Ltd., Daejeon (KR)

(72) Inventor: Woojeong Kim, Daejeon (KR)

(73) Assignee: TR BELTRACK CO., LTD., Daejeon (KR)

( * ) Notice: Subject to any disclaimer, the term of this patent is extended or adjusted under 35 U.S.C. 154(b) by 168 days.

(21) Appl. No.: 15/475,593

(22) Filed: Mar. 31, 2017

(65) Prior Publication Data

US 2017/0320528 A1 Nov. 9, 2017

(30) Foreign Application Priority Data

May 3, 2016 (KR) .......................... 10-2016-0054493

(51) Int. Cl.
B62D 55/088 (2006.01)
B62D 55/24 (2006.01)
B62D 55/26 (2006.01)

(52) U.S. Cl.
CPC ......... *B62D 55/088* (2013.01); *B62D 55/244* (2013.01); *B62D 55/26* (2013.01)

(58) Field of Classification Search
CPC ..... B62D 55/088; B62D 55/244; B62D 55/26
USPC ....................................................... 305/100
See application file for complete search history.

(56) References Cited

U.S. PATENT DOCUMENTS

| 2003/0094854 A1* | 5/2003 | Rodgers | B62D 55/244 305/166 |
| 2009/0309415 A1* | 12/2009 | Shimozono | B62D 55/244 305/177 |
| 2015/0042152 A1* | 2/2015 | Lussier | B62D 55/125 305/165 |
| 2015/0353152 A1* | 12/2015 | Hakes | B62D 55/20 305/15 |

* cited by examiner

*Primary Examiner* — S. Joseph Morano
*Assistant Examiner* — Jean W Charleston
(74) *Attorney, Agent, or Firm* — Rabin & Berdo, P.C.

(57) ABSTRACT

A crawler with a wear limit indicator comprises a crawler main body, sprocket holes formed to pass through a central portion of the crawler main body at equal intervals, core metals configured to be inserted and installed in-between the sprocket holes, left lugs configured to protrude from one surface of the crawler main body and simultaneously overlap with the sprocket holes and one of the core metals, right lugs configured to protrude from the other surface of the crawler main body and simultaneously overlap a pair of adjacent core metals, and a wear limit indicator configured to protrude from front and rear surfaces of the left lugs and the right lugs and inform that a replacement time for a crawler has come when worn-out surfaces of the left lugs and the right lugs are placed on the same horizontal plane as the wear limit indicator.

7 Claims, 4 Drawing Sheets

CRAWLER WITH WEAR LIMIT INDICATOR

CROSS-REFERENCE TO RELATED APPLICATION

This application claims priority to and the benefit of Korean Patent Application No. 10-2016-0054493, filed on May 3, 2016, the disclosure of which is incorporated herein by reference in its entirety.

BACKGROUND

1. Field of the Invention

The present invention relates to a new-concept technology for extending a crawler's life by informing a user that a replacement time has come for a crawler when a lug of the crawler is worn out and preventing various foreign substances from being introduced into a sprocket hole of the crawler.

2. Discussion of Related Art

A traveling mechanism using a crawler is widely used in agricultural machines, construction machines, and the like. A rubber crawler is formed in a stepless shape with a rubber elastic material and rotates by being wound in a vehicle having a rubber crawler traveling mechanism mounted thereon.

The rubber crawler traveling mechanism including the rubber crawler is currently widely used in agricultural machines such as a combine and construction work machines such as a backhoe.

Such a conventional general crawler is formed in a stepless shape using a rubber material, is mounted to be locked between a driving sprocket and an idler at both sides, and rotates by a rotational force of the driving sprocket, thereby having an advancing force.

The driving sprocket is locked to sprocket grooves which are continuously formed at regular intervals at a central portion of the crawler. Here, the crawler formed of a rubber material has core metals formed of a metal material embedded in-between the sprocket grooves to be smoothly driven, and has a guide roller mounted at an outside of a guide protrusion formed at each of the core metals to have a structure in which the crawler is prevented from being detached from the driving sprocket and the idler when the crawler is driven.

As the prior art related to the crawler, Korean Patent Registration No. 1508135 (Title: Duo crawler for wet paddy with improved in mud extraction performance), which is the present applicant's earlier application, is disclosed.

In the prior art, mud extraction performance of the crawler is improved, smooth traveling performance thereof is ensured even on a wet paddy, and a ground contact force thereof is reinforced so that a propulsive force is remarkably improved when the crawler is traveling.

SUMMARY OF THE INVENTION

All conventional crawlers including that of the prior art have excellent performance when lugs thereof are in an early wear stage. However, when the lugs are in a late wear stage, performance of the crawlers is decreased, and the crawlers need to be replaced. A worker cannot identify a degree of wear of the conventional crawlers.

Rubber covering an outer surface of a core metal is easily worn out by being rubbed against a sprocket, a contact portion between the core metal and the rubber is exposed to the outside, the contact portion is destroyed due to foreign substances (rain, snow, sand, pebbles, etc.) introduced through a sprocket hole and permeated therein, and the core metal cannot play its full role. Also, due to the foreign substances stacked on a surface of the core metal, a sprocket is lifted and a wheel separation problem occurs.

A high stress is concentrated to corner portions of the sprocket hole and a crack is generated therein when the sprocket is engaged and driven. Also, mud extraction performance of the lug is degraded, and there is a problem in that traveling performance is not smooth on rugged terrain.

The present invention has been devised to solve the above problems, and provides a technology which enables a user to recognize that a replacement time has come for a crawler when a wear limit indicator formed to protrude from front and rear surfaces of a lug is placed at the same plane as a worn-out surface of the lug.

Further, the present invention provides a technology in which a foreign substance introduction preventing step, which is formed to protrude from an inner surface of a lug to have both sides connected to the wear limit indicator, prevents foreign substances from being introduced into a sprocket hole.

Further, the prevent invention provides a technology in which a stress distributing outwardly-curved surface and a stress distributing inwardly-curved surface formed at corner portions of the sprocket hole can distribute stress caused by an external force generated when a sprocket is engaged and driven.

Further, the present invention provides a technology in which a plurality of bias bumps formed to protrude from both surfaces of a lug enable mud to be smoothly extracted, and a plurality of reinforcing bumps formed to protrude from an inner surface and an outer surface of the lug improves rigidity of the lug and enables the lug to smoothly extract mud.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
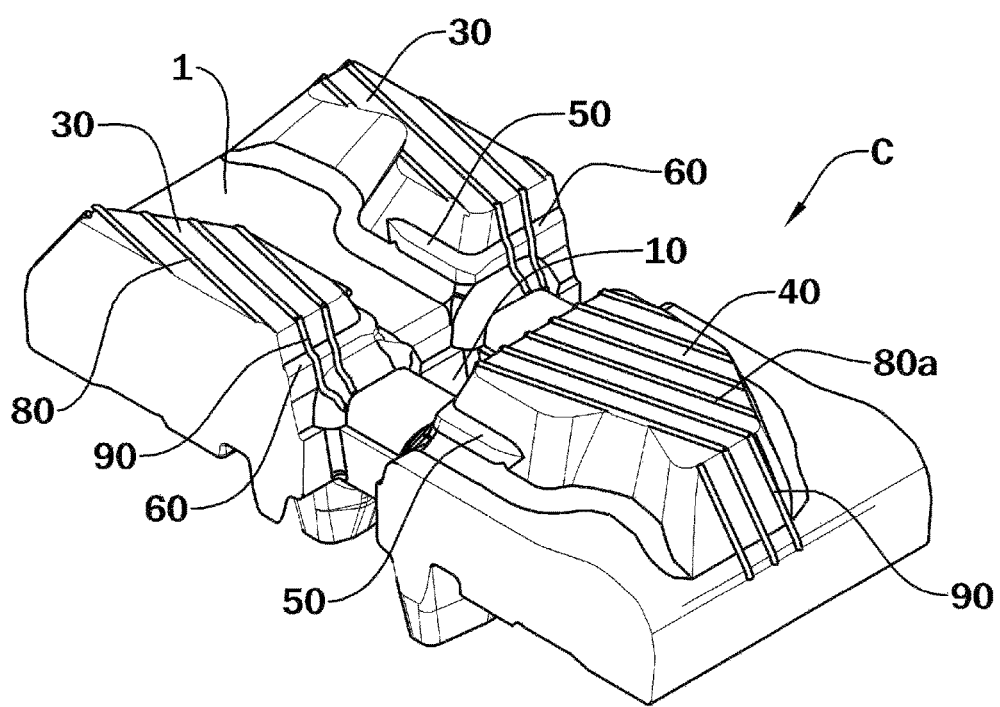
FIG. 1 is a perspective view of a part of a crawler to which the present invention is applied.

Exemplary embodiments for realizing means for solving the problems by the present invention in more detail will be described.

When overall configuration according to exemplary embodiments of the present invention is schematically viewed on the basis of the accompanying drawings, it can be checked that elements of the present invention include a plurality of sprocket holes 10, a plurality of core metals 20, a plurality of left lugs 30, a plurality of right lugs 40, and a wear limit indicator 50.

Hereinafter, the present invention formed of the above schematic configuration will be described in more detail so that the present invention can be easily practiced.

According to the present invention, the plurality of sprocket holes 10 configured to be locked to a sprocket at equal intervals along a longitudinal direction are formed to pass through a central portion of a crawler main body 1 which is steplessly formed, and the plurality of core metals 20 configured to enable the sprocket to be smoothly locked and driven are inserted and installed in-between the sprocket holes 10.

The plurality of left lugs 30 configured to maintain a contact force with the ground are formed to protrude from one surface of the crawler main body 1. Each of the left lugs 30 is arranged to simultaneously overlap with the sprocket hole 10 and an upper portion of a single core metal 20.

Also, the plurality of right lugs 40 configured to maintain a contact force with the ground are formed to protrude from the other surface of the crawler main body 1 to be disposed in-between the left lugs 30. In this way, the left lugs 30 and the right lugs 40 form a zigzag shape with each other.

That is, the right lugs 40 protrude from the other surface of the crawler main body 1 and are arranged to simultaneously overlap a pair of adjacent core metals 20 unlike the left lugs 30.

The wear limit indicator 50 which is a core technology of the present invention configured to inform a user of a replacement time for a crawler C is formed to protrude from each of front and rear surfaces of the left lugs 30 and the right lugs 40. The wear limit indicator 50 is formed at a height lower than that of the surfaces of the left lugs 30 and the right lugs 40.

Consequently, when the left lugs 30 and the right lugs 40 are worn out and worn-out surfaces thereof are placed on the same horizontal plane as the wear limit indicator 50, it shows that a replacement time for the crawler C has come. Thus, by checking whether the worn-out surfaces of the left lugs 30 and the right lugs 40 are placed on the same horizontal plane as the wear limit indicator 50, a user may predict a replacement time for the crawler C and a life thereof and replace the crawler C at the right time. In this way, performance of the crawler C can be prevented from degrading due to wear of the lugs.

To solve the problem in that a contact portion between the core metal 20 and the rubber is destroyed due to various foreign substances (rain, snow, sand, pebbles, etc.) introduced through the sprocket hole 10 and permeated in the contact portion while the crawler C is traveling, a technology for completely blocking foreign substances from being introduced into the sprocket hole 10 is further incorporated in the present invention.

As a technical configuration for the above, a foreign substance introduction preventing step 60 configured to prevent foreign substances from being introduced into the sprocket hole 10 is formed to protrude from inner surfaces of the left lugs 30 and the right lugs 40. Both sides of the foreign substance introduction preventing step 60 is formed to have the same height as that of the wear limit indicator 50 and is integrally connected to the wear limit indicator 50.

Figure 2:
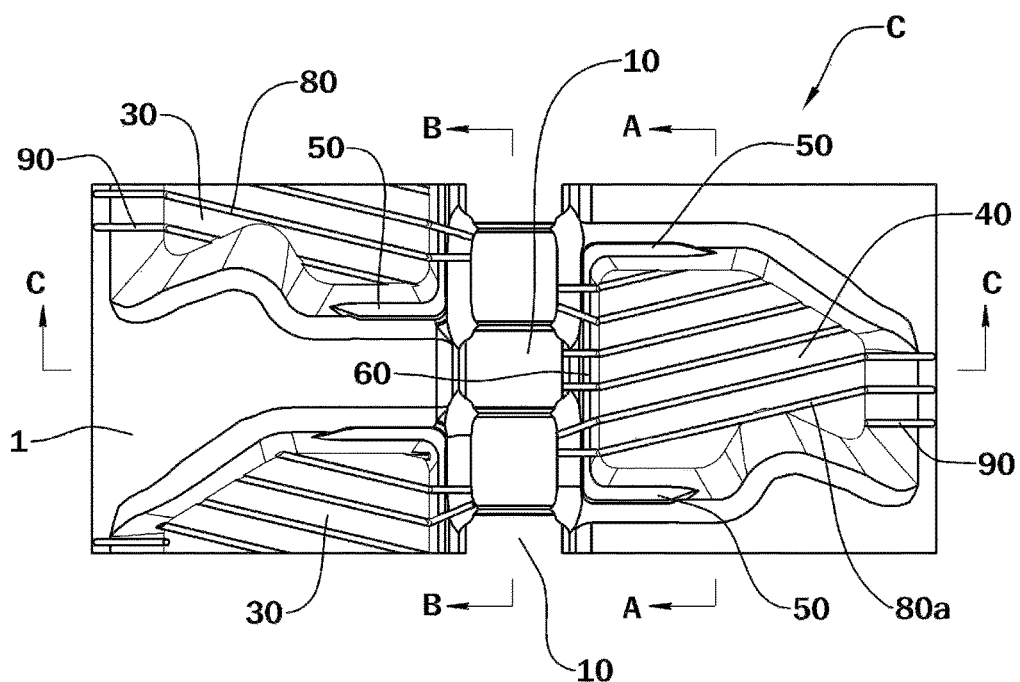
FIG. 2 is a plan view of the crawler according to the present invention.
Figure 3:
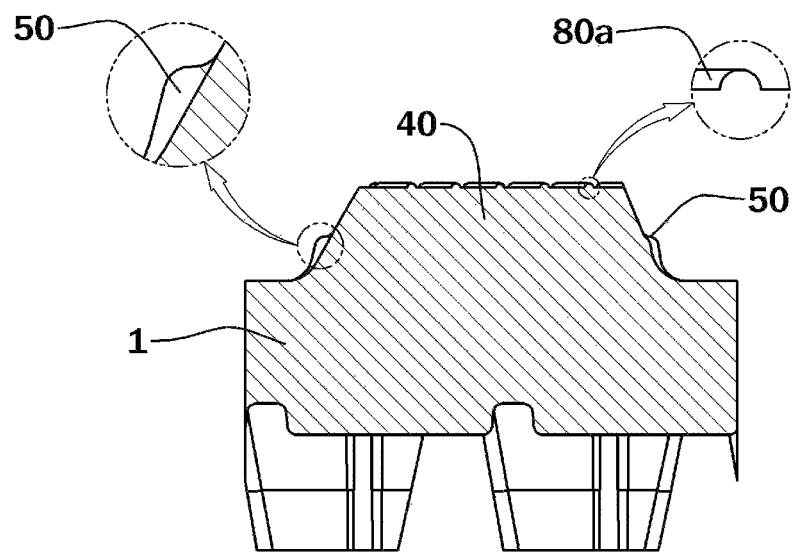
FIG. 3 is a cross-sectional view taken along line A-A of FIG. 2 according to the present invention.
Figure 4:
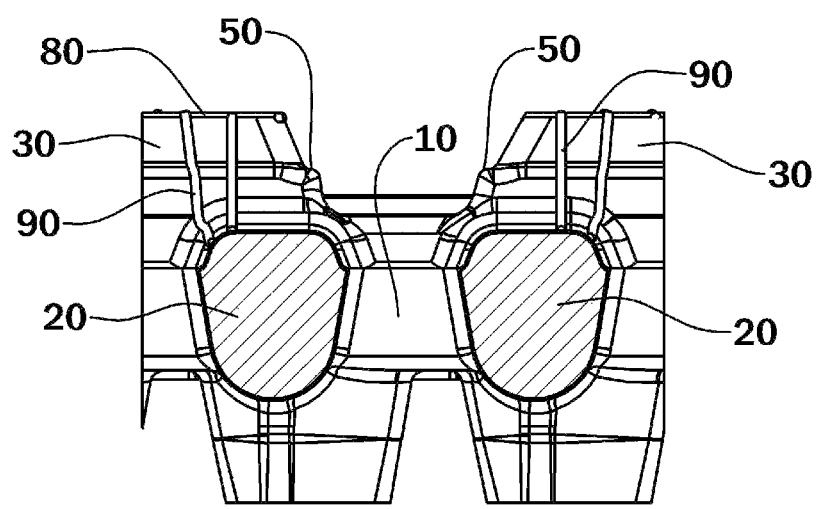
FIG. 4 is a cross-sectional view taken along line B-B of FIG. 2 according to the present invention.
Figure 5:
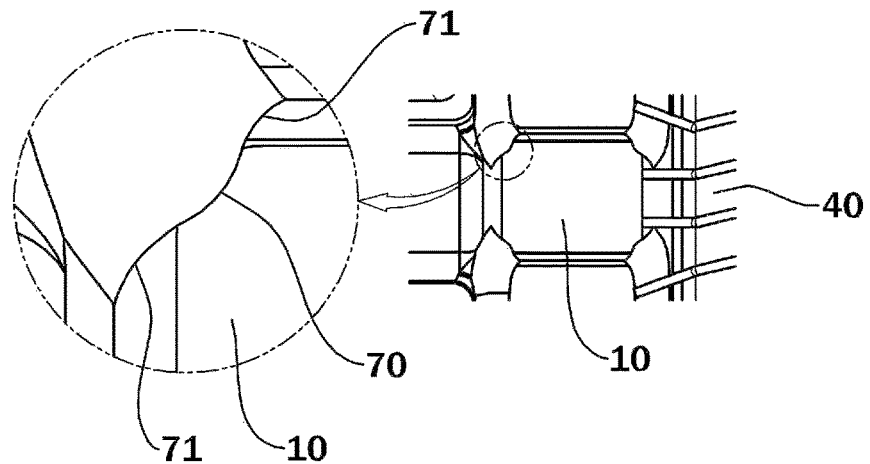
FIG. 5 is an enlarged plan view of a corner portion of a sprocket hole according to the present invention.
Figure 6:
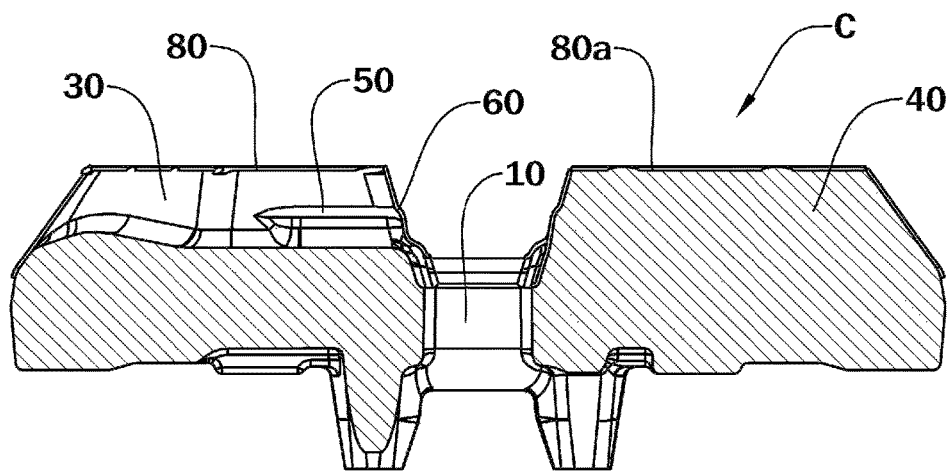
FIG. 6 is a cross-sectional view taken along line C-C of FIG. 2 according to the present invention.

Consequently, the foreign substance introduction preventing step 60 and the wear limit indicator 50 maintain a C-shape as a whole as illustrated in FIG. 2 to block passages from surfaces of the left lugs 30 and the right lugs 40 to the sprocket holes 10 to discharge foreign substances to the outside so that the foreign substances are not introduced into the sprocket holes 10. In this way, even when rubber covering an outer surface of the core metal 20 is easily worn out by being rubbed against the sprocket and the contact portion between the core metal 20 and the rubber is exposed to the outside, foreign substances can be completely blocked from being inserted into the contact portion.

Also, a technology for distributing stress caused by an external force generated when the sprocket is engaged and driven concentrated to corner portions of the sprocket hole 10 is further incorporated in the present invention.

As a technical configuration for the above, the sprocket hole 10 includes a stress distributing inwardly-curved surface 70 configured to distribute concentrated stress and formed to protrude from a central portion of four corner portions. A pair of stress distributing outwardly-curved surfaces 71 are integrally connected and installed at both sides of the stress distributing inwardly-curved surfaces 70 and between inner surfaces of the sprocket holes 10.

Consequently, the stress distributing inwardly-curved surfaces 70 and the stress distributing outwardly-curved surfaces 71 efficiently distribute stress concentrated to the corner portions of the sprocket hole 10 when the sprocket is engaged and driven, thereby suppressing crack generation and remarkably improving durability.

A plurality of bias bumps 80 and 80a are formed to protrude at intervals on surfaces of the left lugs 30 and the right lugs 40 of the present invention. The bias bumps 80 and 80a are formed to be identically inclined in any one of front and rear directions of the left lugs 30 and the right lugs 40, and a degree of inclinations of the bias bumps 80 and 80a is within the range of 15 to 45° to demonstrate the maximum mud extracting performance.

The bias bumps 80 and 80a formed to protrude from the surfaces of the left lugs 30 and the right lugs 40 form a V-shape as a whole and play a role of indicating an advancing direction of the crawler C so that a user can easily recognize the advancing direction. Various foreign substances are discharged by naturally flowing along the inclined bias bumps 80 and 80a so that smoothness of traveling of the crawler C is improved. The bias bumps 80 and 80a distribute a ground contact force with the ground in the V-shape so that wear of the left lugs 30 and the right lugs 40 is suppressed and a life of the crawler C is remarkably extended.

Further, a plurality of reinforcing bumps 90 are formed to protrude at intervals in vertical directions at each of the inner surfaces and outer surfaces of the left lugs 30 and the right lugs 40. The reinforcing bumps 90 maintain to be integrally connected to the bias bumps 80 and 80a in a single line.

That is, the reinforcing bumps 90 protect the left lugs 30 and the right lugs 40 from foreign substances and reinforce rigidity of the left lugs 30 and the right lugs 40, facilitates discharging of foreign substances, and particularly, serves as guides connected to the bias bumps 80 and 80a in a single line, thereby, when the crawler C travels on mud or after rain in a construction site, cleaning the crawler C by self-guiding foreign substances and contaminants to the outside.

According to the present invention, by having a wear limit indicator formed to protrude from front and rear surfaces of a lug, a replacement time for a crawler and a life thereof can be predicted by checking a wear limit of the crawler and the crawler can be replaced at the right time, thereby preventing performance of the crawler from degrading due to wear of the lug.

Also, a foreign substance introduction preventing step and a wear limit indicator formed to protrude from an inner surface of the lug extract foreign substances to the outside so that the foreign substances are not introduced into a sprocket hole while the foreign substance introduction preventing step and the wear limit indicator are integrally connected to each other, thereby preventing foreign substances from being permeated in a contact portion between a core metal and rubber, extending a life of the crawler, enabling the core metal to play its full role, preventing foreign substances from being stacked on the core metal, enabling a sprocket to be smoothly engaged and driven, and preventing wheel separation of the crawler.

Further, even when a high stress is concentrated to corner portions of a sprocket hole when the sprocket is engaged and driven, a stress distributing outwardly-curved surface and a stress distributing inwardly-curved surface formed at the corner portions can efficiently distribute the concentrated stress, suppress crack generation, and remarkably improve durability.

Further, by bias bumps formed to protrude from both surfaces of a lug maintaining a V-shape as a whole, an advancing direction of a crawler can easily be recognized, mud extraction performance can be further improved by various foreign substances naturally flowing along the inclined bias bumps, and the lug's wear can be suppressed and a life thereof can be extended by distributing a ground contact pressure with the ground in the V-shape.

Also, by a plurality of reinforcing bumps formed to protrude from an inner surface and an outer surface of the lug, rigidity of the lug is reinforced by protecting the lug from foreign substances and discharging foreign substances can be facilitated, thereby improving smoothness of traveling on rugged terrain.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A crawler with a wear limit indicator, the crawler comprising:
   a crawler main body (1);
   a plurality of sprocket holes (10) formed to pass through a central portion of the crawler main body (1) at equal intervals;
   a plurality of core metals (20) configured to be inserted and installed in-between the sprocket holes (10);
   a plurality of left lugs (30) configured to protrude from one surface of the crawler main body (1) and simultaneously overlap with the sprocket holes (10) and one of the core metals (20);
   a plurality of right lugs (40) configured to protrude from the other surface of the crawler main body (1) and simultaneously overlap a pair of adjacent core metals (20); and
   a wear limit indicator (50) configured to protrude from front and rear surfaces of the left lugs (30) and the right lugs (40) and inform that a replacement time for a crawler (C) has come when worn-out surfaces of the left lugs (30) and the right lugs (40) are placed on the same horizontal plane as the wear limit indicator (50),
   wherein a foreign substance introduction preventing step (60) configured to prevent foreign substances from being introduced into the sprocket holes (10) is formed to protrude from inner surfaces of the left lugs (30) and the right lugs (40), and both sides of the foreign substance introduction preventing step (60) is formed to have the same height as that of the wear limit indicator (50) and is integrally connected to the wear limit indicator (50).

2. The crawler of claim 1, wherein the wear limit indicator (50) is formed at a height lower than that of the surfaces of the left lugs (30) and the right lugs (40).

3. The crawler of claim 1, wherein the sprocket holes (10) include a stress distributing inwardly-curved surface (70) configured to protrude from a central portion of four corner portions, a pair of stress distributing outwardly-curved surfaces (71) connected and installed at both sides of the stress distributing inwardly-curved surfaces (70) and between inner surfaces of the sprocket holes (10), and the stress distributing inwardly-curved surfaces (70) and the stress distributing outwardly-curved surfaces (71) distribute stress concentrated to the corner portions of the sprocket holes (10) when the sprocket is engaged and driven.

4. The crawler of claim 1, wherein a plurality of bias bumps (80) and (80a) are formed to protrude at intervals on surfaces of the left lugs (30) and the right lugs (40).

5. The crawler of claim 4, wherein the bias bumps (80) and (80a) are formed to be identically inclined in any one of front and rear directions of the left lugs (30) and the right lugs (40), indicate an advancing direction of the crawler (C) while forming a V-shape as a whole, discharge foreign substances, and distribute a ground contact pressure.

6. The crawler of claim 4, wherein a plurality of reinforcing bumps (90) are formed to protrude at intervals in vertical directions at the inner surfaces and outer surfaces of the left lugs (30) and the right lugs (40).

7. The crawler of claim 6, wherein the bias bumps (80) and (80a) and the reinforcing bumps (90) are connected with each other in a single line to serve as guides for discharging foreign substances.

* * * * *